Dec. 16, 1924.
J. PRIESNITZ
1,519,928
SEED DISPENSER
Filed March 18, 1924
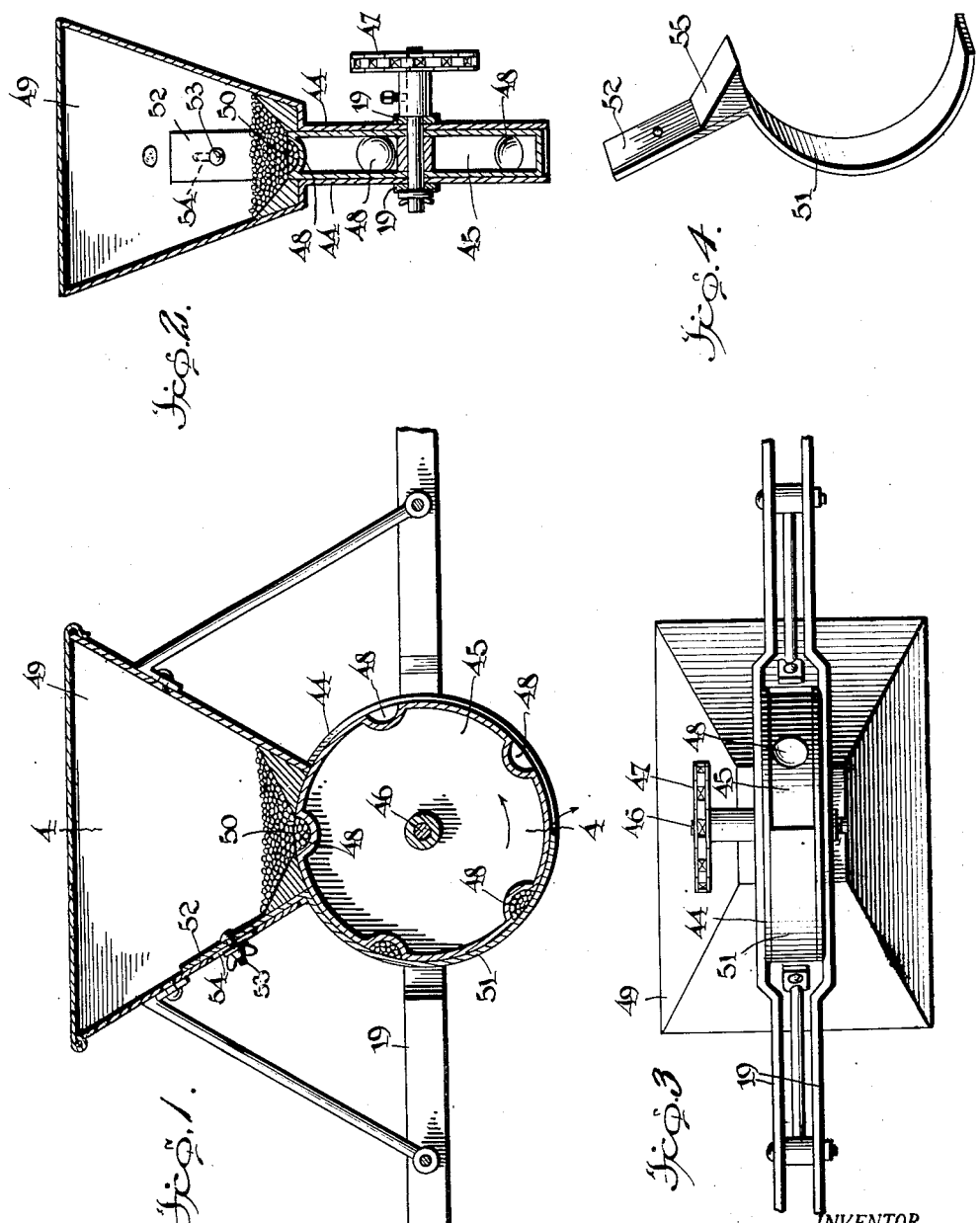
INVENTOR.
J. Priesnitz,
BY
Geo. P. Kimmel
ATTORNEY.

Patented Dec. 16, 1924.  1,519,928

UNITED STATES PATENT OFFICE.

JOSEPH PRIESNITZ, OF OLMITZ, KANSAS.

SEED DISPENSER.

Application filed March 18, 1924. Serial No. 700,141.

*To all whom it may concern:*

Be it known that I, JOSEPH PRIESNITZ, a citizen of the United States, residing at Olmitz, in the county of Barton and State of Kansas, have invented certain new and useful Improvements in Seed Dispensers, of which the following is a specification.

This invention relates to seeding machines, more particularly to machines arranged to plant sugar beet and like seeds, and has for one of its objects to simplify and improve the construction and increase the efficiency of devices of this character.

With these and other objects in view the invention consists in certain novel features of construction as hereinafter shown and described and then specifically pointed out in the claims, and in the drawings illustrative of the preferred embodiment of the invention—

Figure 1 is a longitudinal section of the improved device.

Figure 2 is a section on the line 2—2 of Figure 1.

Figure 3 is a bottom plan view of the parts shown in Figure 1.

Figure 4 is a detached perspective view of one of the combined shields and seguides.

The beam members 19 are adapted to support the seed dropper mechanism which includes spaced disks or side plates 44 and between which a drum 45 is mounted to rotate with a stub shaft 46 journalled through the beams 19, and carrying a chain wheel 47. The periphery of the drum 45 is provided with a plurality of indentations or seed receiving pockets 48, preferably an odd number, for instance five, as shown.

The hopper or receptacle for the seed are represented as 49, positioned above the feed drum 45.

The seed distributing or dropping device is illustrated in Figures 1, 2, and 3, and is formed with a contracted discharge 50 preferably corresponding in area to one of the pockets 48 and beneath which the latter consecutively register when the drum 45 is rotated.

Bearing over the forward portion of the drum 45 is a shield 51 curved to closely engage the outer face of the drum, and with an extension or holder 52 extending upwardly into the hopper 49 and coupled adjustably to the hopper by a clamp screw 53 which operates in a slot 54 in the adjacent wall of the hopper. An angular block 55 is attached to the extension 52 of the shield, and forms a part of the bottom of the hopper, and facilitates the discharge therefrom.

The shield 51 serves to hold the seed within the pockets 48 until they are carried around to the lower side of the drum, or into position to be dropped into the furrow formed by a suitable furrow opener, not shown.

By this simple arrangement as the machine is drawn over the ground by any suitable motive power the drum 45 is rotated by any suitable means and a quantity of seeds sufficient to fill each of the pockets 48 fed to the pockets consecutively as they pass beneath the discharge of the hopper and each pocketful carried around until the pockets reach the lower ends of the shields 51, when they will drop into the furrow formed by suitable openers, not shown, and will be covered by a suitable coverer device, not shown, in the usual manner.

As before stated, the improved device is designed more particularly for planting sugar beet seeds but may be adapted without material structural change to plant other kinds of seeds, as will be obvious.

The improved device is simple in construction, can be inexpensively manufactured, of any suitable material and any required capacity.

The preferred embodiment of the invention is disclosed in the drawings and set forth in the specification, but it will be understood that modifications within the scope of the claimed invention may be made in the construction without departing from the principle of the invention or sacrificing any of its advantages.

Having thus described the invention, what is claimed as new is:

1. In a device of the class described, a receptacle for the seed, spaced disk members depending from said receptacle, a drum rotative between said disks and smaller than the same and constituting a closure for the discharge of said receptacle and provided with a plurality of seed receiving pockets which pass consecutively beneath the discharge of the receptacle as the drum is rotated, a segmental guard member disposed between the margins of said disks and held from lateral displacement thereby, said guard member operating to retain the seeds in the pockets until they arrive at a predetermined position, a holder member extending from said guard, and means for attaching said holder to the seed receptacle.

3. In a device of the class described, a receptacle for the seed, spaced disk members depending from said receptacle, a drum rotative between said disks and constituting a closure for the discharge of said receptacle and provided with a plurality of seed receiving pockets which pass consecutively beneath the discharge of the receptacle as the drum is rotated, a segmental guard member operating to retain the seeds in the pockets until they arrive at a predetermined position, a holder member extending from said guard, and means for attaching said holder to the seed receptacle.

3. In a device of the class described, a receptacle for the seed, spaced disk members depending from said receptacle, a drum rotative between said disks and constituting a closure for the discharge of said receptacle and provided with a plurality of seed receiving pockets which pass consecutively beneath the discharge of the receptacle as the drum is rotated, a segmental guard member operating to retain the seeds in the pockets until they arrive at a predetermined position, a holding member extending from said guard, an inclined block carried by said holder member and constituting a chute to assist in guiding the seed from said receptacle to the pockets of the drum.

In testimony whereof, I affix my signature hereto.

JOSEPH PRIESNITZ.